Jan. 10, 1928.
G. F. HOPKINS
1,656,149
ENGINE CYLINDER CONSTRUCTION
Filed Feb. 28, 1925
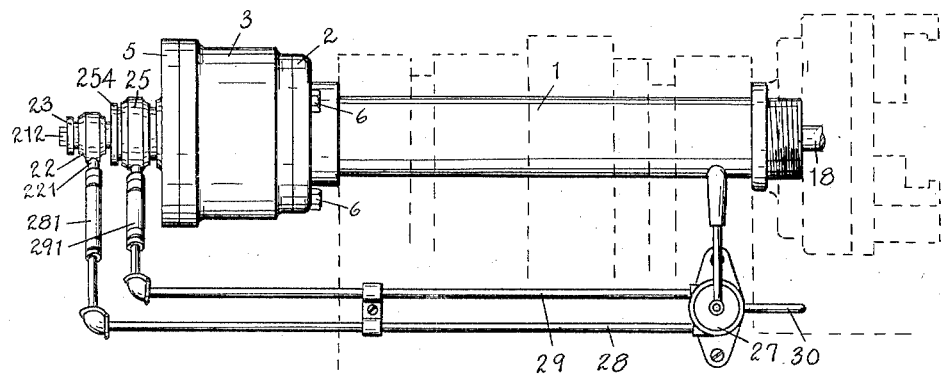
Fig. I.
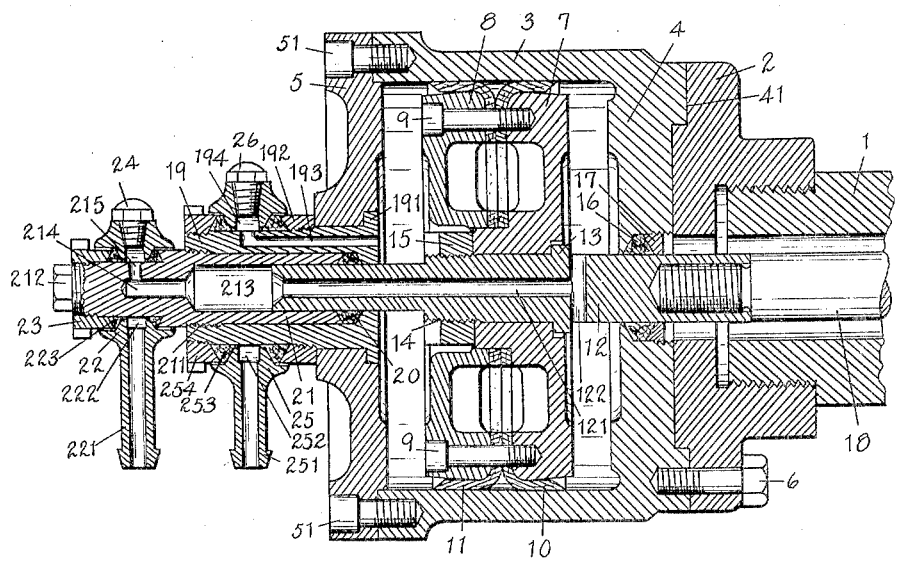
Fig. II.
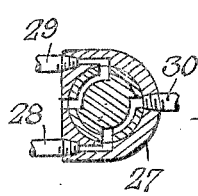
Fig. III.
Inventor
George F. Hopkins
By Chappell Earl
Attorneys Patented Jan. 10, 1928.

1,656,149

UNITED STATES PATENT OFFICE.

GEORGE F. HOPKINS, OF JACKSON, MICHIGAN; WILLIAM K. SAGENDORPH EXECUTOR OF SAID GEORGE F. HOPKINS, DECEASED.

ENGINE-CYLINDER CONSTRUCTION.

Application filed February 28, 1925. Serial No. 12,332.

This invention relates to improvements in engine cylinder construction especially adapted for air control for lathe chucks, although the cylinder is adapted to a great variety of purposes for pneumatic or hydraulic control.

The objects of the invention are,

First, to provide an improved cylinder and piston construction.

Second, to provide improved packing construction which will permit ready assembly and rotation of the entire structure.

Third, to provide improved lubrication for such cylinder and engine.

Fourth, to provide improved supply connections for air or other fluid.

Further objects, relating to details and economies of construction and operation, will definitely appear from the detailed description to follow.

I accomplish the objects of the invention by the devices and means described in the following specification. The invention is pointed out and defined in the claims.

A structure which is a preferred embodiment of my invention is illustrated in the accompanying drawing, forming a part of this application, in which:

Fig. I is a side elevation view of the structure as applied to the live spindle of a lathe, portions of the lathe and chuck being indicated by dotted lines.

Fig. II is an enlarged detail longitudinal sectional view through my improved engine cylinder and piston construction, with parts disposed to show the details on the plane specified.

Fig. III is a detail diagrammatic cross section through the control valve 27.

In the drawing similar numerals of reference refer to similar parts throughout the two views.

The numbered parts of the drawing will be identified by their numerals. 1 is the hollow live spindle of a lathe. 2 is the adapter flange screw-threaded thereto. 3 is the engine cylinder having integral head 4 provided with a suitable centering face 41 adapting it to the adapter flange 2 where it is retained in position by cap screws 6. 5 is the removable cylinder head retained in position by cap screws 51.

The piston is chambered out to make it light and it is composed of the main part 7 and a ring co-operating part 8, the parts being held and retained together by screws 9. The parts 7 and 8 clamp the inwardly-projecting portion of hydraulic cup packings 10 and 11 for each portion of the divided piston. 12 is the piston rod provided with collar 13 and threaded at 14 to receive the clamping nut 15 for retaining and coupling these parts together. A gasket 16 is provided for the piston in the integral head 4, which is retained by the gland 17, it being necessary to disconnect the cylinder from the adapter 2 in order to pack this joint.

18 is the connecting rod from the piston rod 12 to the chuck, the details of the connection not being here involved and not shown.

19 is an air connector bushing provided with a flange 191 and with a screw-threaded gland nut 192 to clamp the same in place centrally in the cylinder head 5. The piston rod 12 is provided with a central bore 121, terminating in a cross bar 122, for the passage of air or other fluid for the actuation of the cylinder. A packing 20 is around this piston rod 12 in the bushing 19. The rod 12 extends into a sleeve 21 which is threaded at 211 for engagement in a central bore in the sleeve 19. This sleeve 21 is chambered at 213 for the reciprocation of rod 12, and is provided with a hexagon nut extension 212 at the outer end for adjusting the same against the packing 20. The inner end of this sleeve serves as a gland for the packing and its chamber is connected to the bore of the piston rod.

22 is the fluid supply ring connection surrounding the outer end of sleeve 21, within which the sleeve is revoluble. This ring extends into a hose connection 221 and is provided with an annular opening 222 to which it delivers. Suitable packings 223 are each side of the ring and are retained in position by the gland 23 screw-threaded onto the outer end of the sleeve 21. The sleeve 21 revolves in contact with the packing at each side of the said ring 22. An oil hole with suitable oil hole valve 24 is provided to deliver oil into the annular opening 222, or at any other suitable point in the passage.

A fluid supply ring 25 embraces the projecting end of the bushing 19 which revolves within the same. This is provided with a hose connection 251 and a connecting annular passage 252 for the passage of fluid. The bushing 19 is provided with a series of longitudinal bores 193 and outwardly-projecting cross bores 194 disposed to connect with the annular passage 252.

The ring 25 is provided with packings 253 at each side which are retained by the gland 254 so that the bushing 19 revolves in contact with said packing within the said ring 25. A suitable valved oil opening 26 is provided delivering into the annular opening 252, which may deliver at any other point within this passage. Air or other fluid is supplied by the three-way control valve 27 delivering through pipe 28 and hose 281 to the hose connection 221 on the supply ring 22, and through the pipe 29 and hose 291 to the hose connection 251 to supply ring 25 on the said bushing 19. The supply comes through pipe 30, as indicated in Fig. I. Details of this three-way connection are shown in Fig. III.

I have described my invention as especially adapted for use in air controlled chucks on lathes. However, the structure is adapted to stationary use and wherever the chucking or holding of an article may be required; as, for instance, in holding articles in forms while undergoing heat treatment or hardening; also for holding pieces of work wheresoever such chuck may be required. I have shown the same especially adapted for air as the medium because that lends itself well to lathe chuck work. The same, however, is well adapted to hydraulic use, especially where oil is made use of as the medium. When the chuck is stationary, of course, there is no need to provide for the relative revolution of the parts and where the same is made use of for general purposes no adapter flange is needed for connection.

The operation of the structure is very simple. Air is admitted through the ring 22, through the annular passage 222, into the bore 214 through the cross bore 215, into the chamber 213, through the central bore 121 in the piston rod, through the cross bore 122 into the cylinder to actuate the piston toward the left, as seen in Fig. II. When the air or other medium is admitted in this way and the piston moves toward the left, the air or other medium is discharged through the apertures 193 out through the cross bores 194 to the annular passage 252 in supply ring 25, out through the hose connection 251. This action is reversed by merely reversing the valve 27. Because the piston is hollow and substantially fills the cylinder at each end of the stroke, the amount of air or other medium is greatly economized and the cylinder made correspondingly effective.

To completely lubricate the cylinder and all bearings, I introduce lubricant through the valved openings 24 and 26 and the air passages where the flow of air inwardly through the same carries the lubricant into the cylinder onto the piston, lubricating the same very thoroughly and also lubricating the piston rod, and incidentally in passing inwardly it lubricates the bearings between the moving parts and effectively lubricates the entire device.

The oil in the annular passages is especially well presented and delivered. The air can escape and will collect the oil on the intake and carry it into the cylinder.

Having thus described my invention, what I claim as new and desire to secure by Letters Patent, is:

1. In an engine cylinder construction the combination of a cylinder, a piston within the same divided transversely and chambered to reduce weight, a double cup packing projecting in opposite directions and clamped between the said chambered cylinder parts, a piston rod connected to said piston and projecting axially through suitable gland and gasket stuffing boxes at each side, with connection at one side to the chuck to be operated, the opposite end being provided with a central bore extending through the piston with cross bore at the inner end, a head with central bushing for the opposite end of the cylinder apertured longitudinally with cross bores at the outer end for the flow of the actuating medium, a central adjustable sleeve, screw threaded in the said bushing to serve as the gland for the piston rod stuffing box, with cross bores towards the outer end and with projecting end for adjustment, a connection for the air or other medium comprising a ring with annular passage embracing the outer end of the said sleeve and registering with said cross bore, suitable packings for the said supply ring, adjustable glands for retaining the packing in revoluble contact with said ring, a valved lubrication opening delivering into said annular space, a connection for air or other medium comprising a supply ring surrounding the projecting end of said bushing, provided with an annular passage embracing the said bushing and registering with said cross bore, suitable packings at each side thereof, an adjustable gland for retaining the said packings in place in revoluble contact with said ring, and a valved lubrication opening delivering to said annular opening, coacting as described.

2. In an engine cylinder construction the combination of a cylinder, a piston within the same divided transversely and chambered to reduce weight, a double cup packing projecting in opposite directions and clamped between the said chambered cylinder parts, a piston rod connected to said piston and projecting axially through suitable gland and gasket stuffing boxes at each side, with connection at one side to the chuck to be operated, the opposite end being provided with a central bore extending through the piston with cross bore at the inner end, a head with central bushing for the opposite end of the cylinder apertured longitudinally with cross bores at the outer end for the flow of the actuating medium, a central adjustable sleeve, screw threaded in the said bushing to serve as the gland for the piston rod stuffing box, with cross bores toward the outer end and with projecting end for adjustment, a connection for the air or other medium comprising a ring with annular passage embracing the outer end of the said sleeve and registering with said cross bore, suitable packings for the said supply ring, adjustable glands for retaining the packing in revoluble contact with said ring, a connection for air or other medium comprising a supply ring surrounding the projecting end of said bushing, provided with an annular passage embracing the said bushing and registering with said cross bore, suitable packings at each side thereof, and an adjustable gland for retaining the said packings in place in revoluble contact with said ring, coacting as described.

3. In an engine cylinder construction the combination of a cylinder, a divided piston within the same, a piston rod connected to said piston and projecting axially through suitable gland and gasket stuffing boxes at each side, with connection at one side to the chuck to be operated, the opposite end being provided with a central bore extending through the piston with cross bore at the inner end, a head with central bushing for the opposite end of the cylinder apertured longitudinally with cross bores at the outer end for the flow of the actuating medium, a central adjustable sleeve, screw threaded in the said bushing to serve as the gland for the piston rod stuffing box, with cross bores toward the outer end and with projecting end for adjustment, a connection for the air or other medium comprising a ring with annular passage embracing the outer end of the said sleeve and registering with said cross bore, suitable packings for the said supply ring, glands for retaining the packing in revoluble contact with said ring, a connection for air or other medium comprising a supply ring surrounding the projecting end of said bushing, provided with an annular passage embracing the said bushing and registering with said cross bore, suitable packings at each side thereof, and an adjustable gland for retaining the said packings in place in revoluble contact with said ring, coacting as described.

4. In an engine cylinder construction the combination of a cylinder, a divided piston within the same, a piston rod connected to said piston and projecting axially through suitable stuffing boxes at each side, with connection at one side to the chuck to be operated, the opposite end being provided with a central bore extending through the piston with cross bore at the inner end, a head with central bushing for the opposite end of the cylinder apertured longitudinally with cross bores at the outer end for the flow of the actuating medium, a central adjustable sleeve, screw threaded in the said bushing to serve as the gland for the piston rod packing, with cross bores toward the outer end and with projecting end for adjustment, a connection for the air or other medium comprising a ring with annular passage embracing the outer end of the said sleeve and registering with said cross bore, suitable packings for the said supply ring, and glands for retaining the packing in revoluble contact with said cross ring, coacting as described.

In witness whereof, I have hereunto set my hand.

GEORGE F. HOPKINS.